United States Patent
Nadeau

(10) Patent No.: US 6,240,449 B1
(45) Date of Patent: May 29, 2001

(54) METHOD AND APPARATUS FOR AUTOMATIC CALL SETUP IN DIFFERENT NETWORK DOMAINS

(75) Inventor: Raymond Nadeau, Verdum (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/184,030

(22) Filed: Nov. 2, 1998

(51) Int. Cl.⁷ ................................................. G06F 13/14
(52) U.S. Cl. ............................................ 709/223; 709/227
(58) Field of Search ..................................... 709/227, 223

(56) References Cited

U.S. PATENT DOCUMENTS 6,052,680 * 4/2000 Towell .................................... 706/47
6,122,276 * 9/2000 Boe et al. ............................. 370/389

FOREIGN PATENT DOCUMENTS

WO 96 38018   11/1996   (WO).
WO 9848542    10/1998   (WO).

OTHER PUBLICATIONS

U.S. application Ser. No. 08/994,008, Charles J. Meubus et al., filed Dec. 18, 1997.
IETF Internet Draft, Patrik Falstrom & Bjorn Larsson, Jun. 1998                ftp://ftp.ietf.org/internet–drafts/draft–falstrom–e164–00.txt.

\* cited by examiner

Primary Examiner—Kenneth R. Coulter

(57) ABSTRACT

The present invention provides a method and a system for managing communication sessions originating in either one of a telecommunications network, such as the PSTN network or a mobile telephone network, and a data communications network such as the Internet. The system includes a service logic controller supporting a data structure that holds a plurality of communication session disposition program records. The service logic controller connects with the telecommunications network and with the data communications network through respective gateways that transmit communication session disposition inquiry messages. In response to those messages, the service logic controller retrieves the appropriate communication session disposition program. If the program is instructive to establish an Internet domain connection, the service logic controller transmits to a gatekeeper functional element an Internet address request. The service logic controller then generates an instruction to the entity that originated the inquiry message in accordance with a response from the gatekeeper functional element. If the program does not require an Internet connection, the service logic controller generates an instruction to the entity that originated the inquiry message in accordance with the program itself. The communication session is then processed according to the instruction.

17 Claims, 4 Drawing Sheets

METHOD AND APPARATUS FOR AUTOMATIC CALL SETUP IN DIFFERENT NETWORK DOMAINS

FIELD OF THE INVENTION

The present invention relates to the field of telephony systems. It is particularly applicable to such systems which provide subscribers with communication sessions across a variety of network domains, such as the Public Switched Telephone Network (PSTN), the Mobile network and the Internet.

BACKGROUND OF THE INVENTION

The telecommunications environment is one of continuous evolution and technological advancement. Whereas historically it consisted strictly of analog POTS (Plain Old Telephone Service), supported by the PSTN, this environment has expanded to include not only the Mobile network but also, more recently, digital data transmission of increasing quantity and speed, supported by the Internet.

Prior to the introduction of the Internet, a class of telephony services usually known as Single Number Service (SNS) or Personal Number Service (PNS) had been introduced in the marketplace to address the mobility and call management needs of telephony network subscribers. The main characteristic of this class of services was, and still is, to provide call routing based on customer-programmed schedules, usually implemented through proprietary service logic, residing on either Service Control Points (SCP), an Advanced Intelligent Network (AIN) or Intelligent Network (IN), or on special purpose switch adjuncts or service nodes. The Internet has had an important effect on these telephony services, increasing not only the number of events and conditions influencing call completion decisions, but also the number of mechanisms available to reach a called party, as well as the number of potential call delivery points. Correspondingly, a co-pending patent application entitled "System and method for communication session disposition responsive to events in a telecommunications network and the Internet", filed on Dec. 18, 1997, Ser. No. 05/994,008 and assigned to Northern Telecom Limited, now allowed discloses a communication session disposition mechanism able to make decisions regarding communication session disposition based on a broader range of events. The subject invention includes primarily a novel Service Logic Controller (SLC) responsive to events occurring in a telecommunications network (PSTN or Mobile network) or a data communications network (such as the Internet) for making decisions regarding the disposition of different communication sessions, for instance a telephone call or a fax transmission.

However, until such a flexible communication session disposition mechanism becomes ubiquitous in the telephony system, placing a call on the Internet telephony network will require a lot more from the caller than placing a call on the PSTN. The caller must first be connected to the Internet in order to figure out the address of the person to be called, and must also know where to look for this address. Another option available today is to use the services of Internet Telephony Service Providers (ITSP). In such a case, the caller must call into a voice-over-IP (VOIP) gateway, where IP stands for Internet Protocol, and supply the called party directory number. The gateway then routes the call through the Internet to the gateway closest to the called party and completes the call over the PSTN. If the called party happens to be connected to the Internet at the moment of calling, the caller will most likely end up listening to a busy signal, or may be connected to the called party's voice mailbox. If the call is completed anyhow, the caller might end up paying unnecessary toll charges for the last leg of the call if the called party does not live in an area deserved by the VOIP gateway. In all cases, the caller must explicitly know some extra information (IP address, VOIP gateway director number), and must perform some extra steps in order to place the call.

Some companies offer a service based on proprietary devices to simplify the establishing of a call between two parties over the Internet. An example of such a service is the Internet appliance commercialized by Aplio in the United-States. More information may be found on this topic at the Internet address (www.aplio.com). Unfortunately, the disadvantages of such a service are that both ends must own a special device, both ends must have a subscription to an Internet Service Provider (ISP), and the communication session setup requires an extended period of time.

In summary, when a caller wishes to establish a call within the Internet domain, the caller must find the IP address of the called party through the means of different services available within the Internet domain. In other words, work and effort is required on the part of the caller; it is not automatic. Even if the caller wanted to complete a call from the Internet domain into the PSTN domain, a PSTN/IP gateway is required. The caller must therefore determine the address of such a server in the vicinity of the called party in order to avoid toll charges.

Thus, there exists a need in the industry to simplify and refine the process of using the Internet domain, in tandem with both the PSTN and Mobile network, for calling purposes within modern telephony systems.

OBJECTS AND STATEMENT OF THE INVENTION

An object of the invention is to provide a novel Service Logic Controller (SLC) responsive to events occurring in a telecommunications network and a data communications network to make decisions regarding the disposition of a certain communication session, such as a telephone call or a fax transmission.

Yet another object of the invention is to provide a novel method for using the Internet facilities to manage a communication session originating in either one of a telecommunications network and a data communications network, such as the Internet.

As embodied and broadly described herein, the invention provides a service logic controller for the management of communication sessions originating in either one of a telecommunications network and the Internet, said service logic controller including:

a central processing unit;

a memory in data communicative relationship with said central processing unit, said memory holding a data structure including a plurality of records, each record including an information element indicative of a certain communication session disposition program;

a program element in said memory that is executed by said central processing unit;

a first connection point permitting to exchange data between said service logic controller and the telecommunications network;

a second connection point permitting to exchange data with the Internet;

a third connection point permitting to exchange data with an Internet gatekeeper functional element, the Internet gatekeeper functional element returning in response to Internet address request messages Internet location messages;

said program element implementing the functions of:
a) processing a communication session disposition inquiry message input through either one of said first and second connection points to associate a certain record in said data structure with the communication session disposition inquiry message;
b) if the communication session disposition program of said certain record is instructive to establish an Internet domain connection, generating and outputting through said third connection point an Internet address request message to seek an IP address of a party with whom a communication session is to be established;
c) processing an Internet location message received at said third connection point in response to the Internet address request message and containing an IP address of a party with whom a communication session is to be established to generate and output through either one of said first and second connection points a communication session disposition instructions message including the IP address of a party with whom a communication session is to be established.

Throughout this specification, the expression "communication session" is intended to encompass telephone-related messages, video-conferencing, facsimile transmissions and pager-related calls.

Throughout this specification, the expression "telecommunications network" is intended to encompass networks through which are exchanged primarily, but not exclusively, audio signals, such as the Public Switched Telephone Network (PSTN) and mobile telephone networks.

Throughout this specification, the expression "data communications network" refers to networks that exchange primarily, but not exclusively, data such as electronic mail and file transfers, among others. A typical example of a data communications network is the Internet Protocol (IP) network.

In a specific embodiment of this invention, the SLC connects with three independent network domains, namely the PSTN, a mobile telephone network and the Internet. The connection to the respective network is effected through gateways. Each network is provided with a Detection Point Functional Element (DPFE) whose task is to detect a communication session that needs the services of the SLC. Once such a communication session is detected, say a caller originates a telephone call from the PSTN, the DPFE issues a communication session disposition inquiry message through the associated gateway, directed to the Service Logic Controller (SLC).

The SLC is implemented on a server and includes a memory for storage of program elements implementing different functions necessary to the disposition of communication sessions and, more particularly, to the ACS service. The SLC server further includes a Central Processing Unit (CPU) to execute these program elements, as well as a mass storage unit to hold a data structure in the form of a database, referred to as the Subscriber Database, including a plurality of records, each record being a subscriber or user profile that contains a communication session disposition program. This communication session disposition program determines how a communication session to a particular called party is to be managed in dependence upon various factors, such as the time of day, type of communication, etc. In a very specific example, an illustrative script can be: "Between 8 and 6 on working days, route calls made to John Smith to his office unless his cellular phone is activated, in which case calls should be routed to the cellular phone." In a specific example, the SLC is coupled to a Gatekeeper Functional Element (GKFE) to provide the SLC with means for transparently using the Internet facilities to generate a communication session disposition instruction of the Automatic Call Setup (ACS) service provided by the SLC. The GKFE is an element in the IP network where the mapping of pseudo-addresses into IP addresses takes place. Specifically, in H.323 compliant networks, the GKFE functionality is implemented on a gatekeeper which is responsible for managing all IP telephony related activities in a particular zone, performing call control, managing bandwidth and performing address translation. There are as many gatekeepers as there are zones. Another implementation of a GKFE is the Microsoft Internet Locator Service which performs address translation. The GKFE is thus a distributed functional element in the network. However, until the IP telephony network is fully standardized, it is simpler to implement the GKFE as a single node communicating with the different gatekeepers and locator services in the Internet domain. This single GKFE node handles the different protocols needed to interact with H.323 gatekeepers and different proprietary locator services. When an Internet domain connection is required to complete a call, and the necessary IP address is not available in the Subscriber Database of the SLC, the SLC generates and transmits to the GKFE an Internet address request message including the pseudo-address of the called party, where this pseudo-address is frequently an e-mail address. Upon reception of an Internet address request message from the SLC, the GKFE fetches the corresponding IP address from the appropriate H.323 gatekeeper or locator service in the network. If the gatekeeper or locator service is unknown, the GKFE broadcasts the Internet address request message, including the pseudo-address, to all known gatekeepers and locator services. This functionality enables the ACS service to automatically and transparently retrieve IP address from the IP network. The term "transparently" implies that an ACS subscriber is able to reach someone on the Internet with no permanent address without actually accessing the Internet.

Once the communication session disposition instruction is generated by the SLC, a message is assembled and transmitted to the DPFE that requested the instruction. The latter, upon receipt of the instruction, manages the session accordingly.

As embodied and broadly described herein, the invention also provides a system for the management of communication sessions originating in either one of a telecommunications network and the Internet, said system comprising:

a service logic controller, including:
a) a central processing unit;
b) a memory in data communicative relationship with said central processing unit, said memory holding a data structure including a plurality of records, each record including an information element indicative of a certain communication session disposition program;
c) a program element in said memory that is executed by said central processing unit;
d) a first connection point permitting to exchange data between said service logic controller and the telecommunications network;

e) a second connection point permitting to exchange data with the Internet;

a gatekeeper functional element in a data communicative relationship with said service logic controller, said program element implementing the functions of:

i) processing a communication session disposition inquiry message input through either one of said first and second connection points to associate a certain record in said data structure with the communication session disposition inquiry message;

ii) if the communication session disposition program of said certain record is instructive to establish an Internet domain connection, generating and forwarding to said gatekeeper functional element an Internet address request message to seek an IP address of a party with whom a communication session is to be established;

said gatekeeper functional element being responsive to the Internet address request message to obtain the IP address of the party with whom a communication session is to be established and to generate and forward to said service logic controller an Internet location message containing the IP address of the party with whom a communication session is to be established, said program element implementing further functions, including:

processing the Internet location message received at said third connection point to generate and output through either one of said first and second connection points a communication session disposition instructions message including the IP address of a party with whom a communication session is to be established.

As embodied and broadly described herein, the invention also provides a method for managing a communication session originating in either one of a telecommunications network and the Internet domain, said method comprising the steps of:

detecting origination of a communication session in either one of the telecommunications network and the Internet domain;

suspending processing of the communication session;

accessing a data structure containing a plurality of records, each record including an information element indicative of a certain communication session disposition program;

associating a record in said data structure with the communication session, the record including an entry indicative of a particular disposition program applicable to the communication session, the entry including a data element indicative of a pseudo-address in the Internet domain;

if the entry applicable to the communication session is instructive to establish an Internet domain connection, translating the pseudo-address to an IP address;

utilising the IP address to manage the communication session.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention, for which reference should be made to the appending claims.

DESCRIPTION OF A PREFERRED EMBODIMENT

In a preferred embodiment of this invention, an Automatic Call Setup (ACS) service is provided that permits an improved usage of the Internet domain for calling purposes. Specifically, the ACS service allows the establishment of a connection from a caller (subscriber) to a called party, transparently using whichever network (PSTN/Mobile, IP) is best, based on conditions specified by the service subscriber and external conditions. Examples of such external conditions are:

Availability of an IP address for the called party;
Gateway availability (e.g. all local ports could be in use);
Time of day/Day of week (avoids waiting for IP address fetching at times where the called party is unlikely to be connected to the Internet);
Cost-based routing;
Quality of Service routing (automatically avoids using Internet for completing a call in high Internet traffic periods).

Therefore, the preferred embodiment of the invention enables a person not connected to the Internet to transparently use the Internet facilities to complete a call, as well as facilitates call completion for people calling from the Internet domain.

Figure 1:
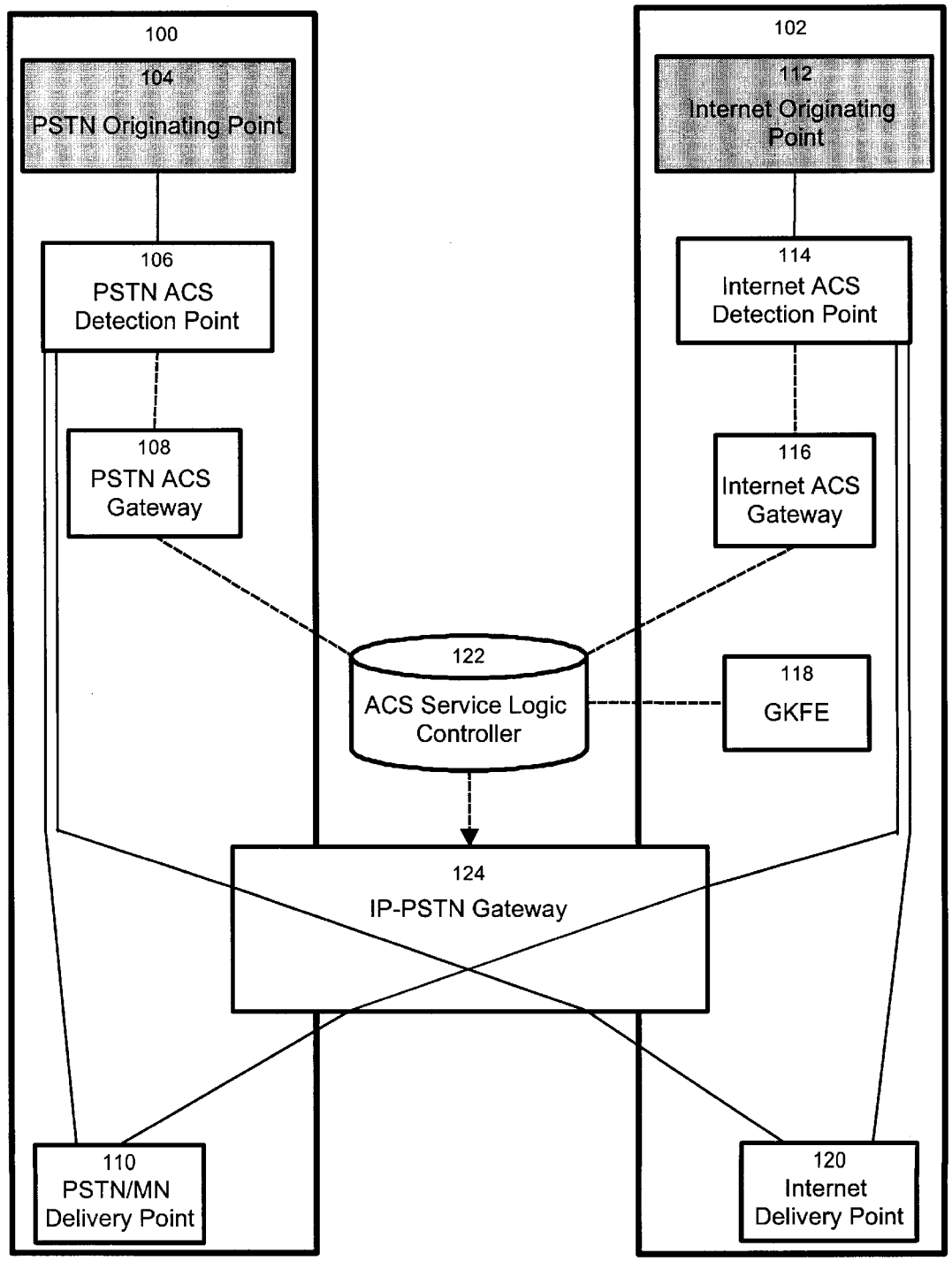
FIG. 1 is a block diagram of a multi-domain communication session disposition system incorporating an Automatic Call Setup service, in accordance with this invention.

FIG. 1 provides a block diagram of the various network components required by the mechanism under a preferred embodiment of the present invention. The various network components and functions shown in FIG. 1 illustrate primarily the logical relationship between these components and functions, and as such may have no direct implications cn either the physical paths, direct or indirect, or the signalling supports used in the different implementations of this invention.

The network components are grouped in two distinct domains, namely the PSTN network domain 100 and the Internet domain 102. As the Mobile network is very similar to the PSTN network 100, it has not been shown as a distinct domain in FIG. 1, but rather is also represented functionally by domain 100. Generally speaking, these domains issue and receive communications that can be telephone related messages or data. The system shown in FIG. 1 is a communication session disposition system, capable of making disposition decisions based on events occurring within each of the network domains.

Each domain comprises several different Functional Elements (FEs). An ACS subscriber will originate a call through the ACS service by using an Originating Point Functional Element (OPFE). There are OPFEs in all three network domains, namely the PSTN or Mobile network OPFE 104, for example a phone in the PSTN network or a handset in the Mobile network, and the Internet OPFE 112, for example a multimedia PC.

A Detection Point Functional Element (DPFE) implements the network functionality which is responsible for identifying call requests that require ACS treatment. For such calls, the DPFE will suspend call processing and originate a request for instructions to the Service Logic Controller (SLC) via a Gateway Functional Element (GWFE). Upon reception of routing instructions from the SLC through the GWFE, the DPFE will resume call processing according to the received instructions and route the incoming call directly to a Delivery Point FE or to the IP/PSTN GWFE 124 if needed. There are DPFEs in all three network domains, namely the PSTN/Mobile network DPFE 106 and the Internet DPFE 114, each responsible for handling the call requests from their respective domains.

The purpose of a Gateway Functional Element (GWFE) is to mediate the instruction requests/responses from/to the DPFE to/from the SLC. There are also GWFEs in all three network domains, namely the PSTN/Mobile network GWFE 108 and the Internet GWFE 116, each responsible for processing the instruction requests originating in their respective domain.

The Service Logic Controller (SLC) 122 forms the core of the ACS service, and does not belong to any one specific network domain. The primary goal of the SLC 122 is to provide the DPFEs with call processing instructions. In order to achieve this task, the SLC 122 will consult a particular caller's service profile, consisting in service logic as well as a list of conditions and events to be used to process the caller's incoming calls. The SLC 122 is the system component which is actually responsive to the events occurring within the different networks, and can be implemented on any suitable server that connects to the different domain gateways 108 and 116. This server includes a memory for storage of program elements implementing different functions necessary to the disposition of communication sessions and, more particularly, to the ACS service. The server further includes a Central Processing Unit (CPU) to execute these program elements, as well as a mass storage unit to hold a Subscriber Database. This Subscriber Database contains all of the user service profiles enabling the SLC logic to take a decision on call disposition, and will be described in more detail below.

The functionality of the Gatekeeper Functional Element (GKFE) 118 is implemented on many different nodes in the IP telephony network. In a H.323 compliant network, these nodes are known as gatekeepers. A gatekeeper is responsible for a particular zone, whereby every VOIP client wishing to receive or make calls in this zone must first register with the gatekeeper. Within this zone, the gatekeeper is responsible for performing the translation of pseudo-addresses, frequently e-mail addresses, into IP addresses. The address translation request is made by sending a H.225 ARQ (Address Request) message to the gatekeeper. This ARQ message includes in particular the pseudo-address to be translated into an IP address. The pseudo-address serves as identification for a particular party when registering to Internet directory services, and allows the gatekeeper to fetch the corresponding IP address for the particular party. The gatekeeper answers the ARQ message with a Location Confirm (LCF) message containing the IP address or with a Location Reject (LRJ) message if no IP address can be returned. As an alternative to H.323 gatekeepers, services such as Microsoft Internet Locator Service (ILS) can be used to perform address translation. The GKFE 118 can be implemented as a single node on a suitable server that communicates with the SLC 122 and the different H.323 gatekeepers and other proprietary locator systems in the IP network. Similar to the SLC, the GKFE 118 server includes a memory for storage of the program element implementing the query function necessary to the translation of a pseudo-address to an IP address, where this query function involves the establishment of communication channels with H.323 gatekeepers as well as with different proprietary locator systems. The server further includes a Central Processing Unit (CPU) to execute this program element.

Figure 2:
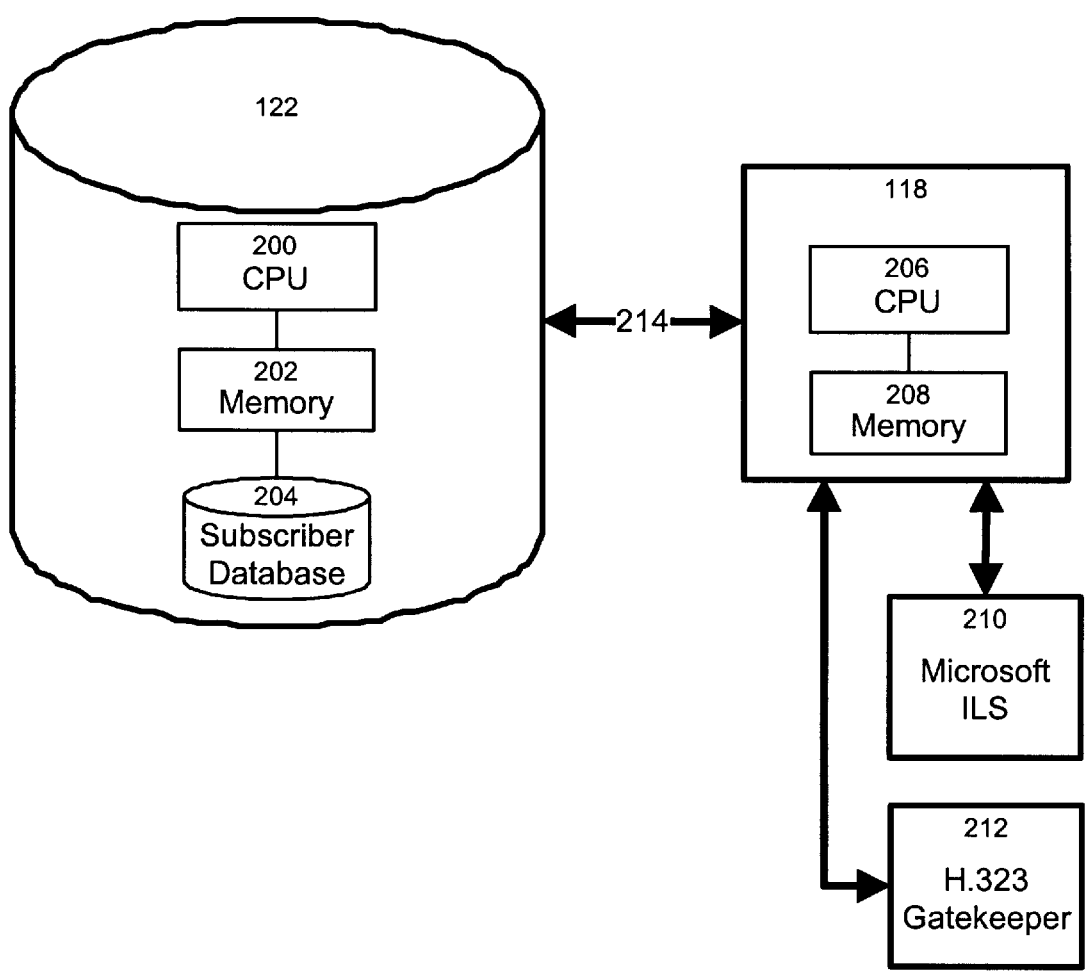
FIG. 2 is a structural block diagram of the ACS Service Logic Controller and IP Gatekeeper, as shown in FIG. 1.

FIG. 2 is a structural block diagram which takes a closer look at both the SLC 122 and the GKFE 118. As described above, the SLC 122 includes a CPU 200, a memory 202 and a mass storage unit for the Subscriber Database 204. Alternatively, the Subscriber Database 204 may be included within the memory 202. The GKFE 118 includes a CPU 206 and a memory 208, where the SLC 122 and the GKFE 118 are interconnected and can exchange communication messages over path 214. The GKFE 118 is shown interconnected to two other components 210 and 212, respectively representing Microsoft ILS and a H.323 gatekeeper. The GKFE 118 may establish several such connections, to other proprietary locator services and other H.323 gatekeepers. When the SLC 122 sends an ARQ message over path 214 to the GKFE 118, the GKFE 118 will extract from the ARQ message the pseudo-address to be mapped into an IP address. Next, the GKFE 118 will itself generate a query message including the pseudo-address, and will send this query message over all connections to proprietary locator services and other H.323 gatekeepers, for example Microsoft ILS 210 and H.323 gatekeeper 212. The GKFE 118 will then await a return message from one of these connections mapping a valid IP address to the pseudo-address. Upon reception of such a return message, the GKFE 118 will send to the SLC 122 an LCF message including the IP address to be used for disposition of the communication session. If no such return message is received by the GKFE 118, a LRJ message is sent to the SLC 118 indicating that the owner of the queried pseudo-address is not currently logged on to the Internet.

The objective of the IP/PSTN GWFE 124 is to route calls between network domains, ensuring that proper protocol conversion as well as media conversion is applied for delivery to a particular Delivery Point FE. There may be more than one IP/PSTN GWFE required between the call's originating point and the call's terminating point.

Delivery Point FEs are the functional entities to which outgoing calls processed by the ACS service are routed to for delivery to a user or any termination point, and exist in all three domains. Examples of a PSTN Delivery Point FE 110 include:

any PSTN phone where the subscriber is registered;

a fax;

a modem;

an audio/video conference;

a messaging service;
    Voice Messaging System (VMS);
    Unified/integrated messaging system.

concerning the Mobile network, examples of a Delivery Point FE 110 include:

a handset;

a fax;

a modem;

a messaging service;
    Voice Messaging Service (VMS);
    Unified/integrated messaging system;
    Short Message Service (SMS).

Finally, examples of an Internet Delivery Point FE 120 include:
  a multimedia PC with:
    a Voice-over-IP (VoIP) client;
    a Fax-over-IP client;
  an Internet appliance;
  an Internet audio/video conferencing server.

Figure 3:
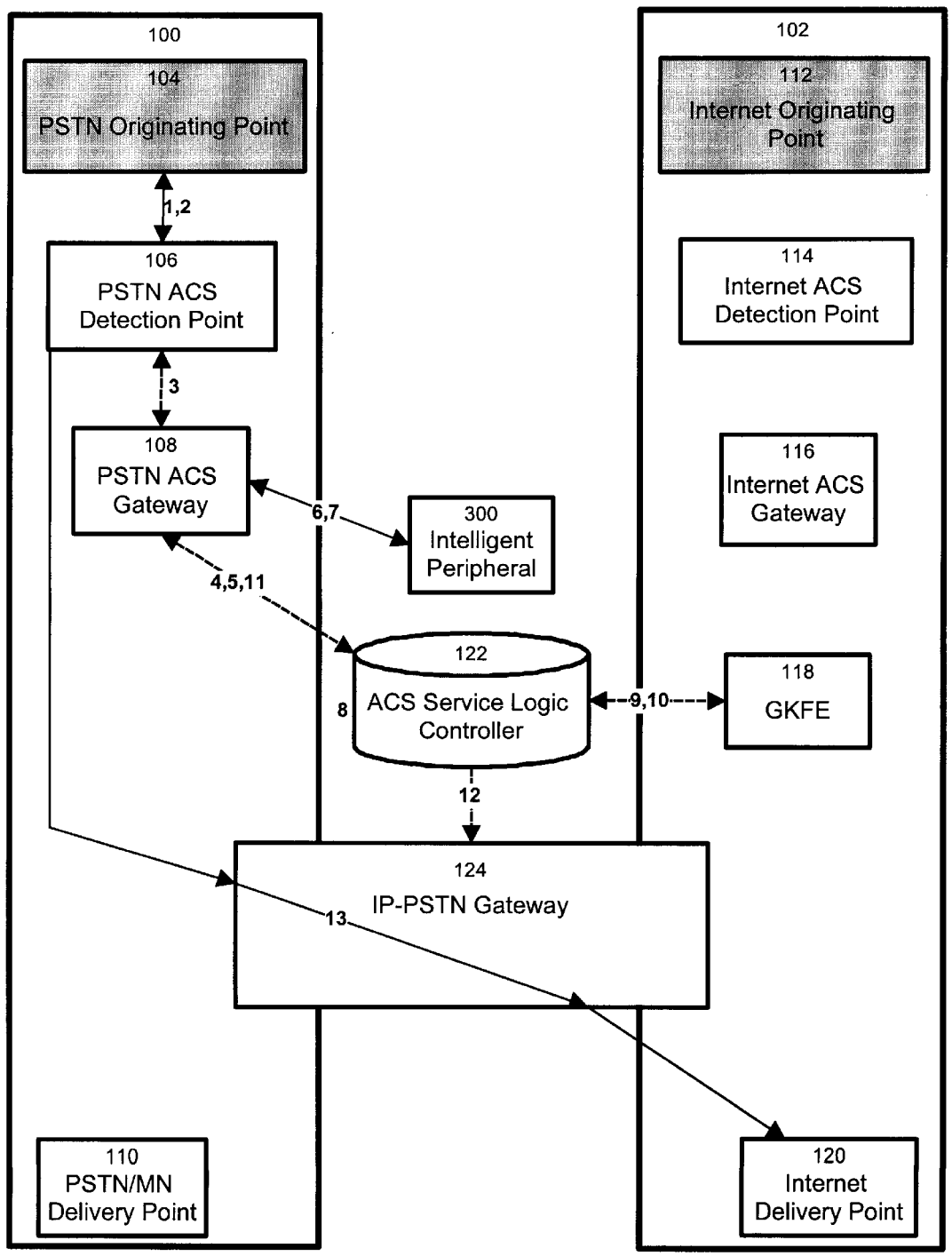
FIG. 3 depicts an example of a functional information flow, originating in the Internet domain, for the communication session disposition system shown in FIG. 1.

In addition to the above components that form part of a communication session disposition system incorporating the ACS service, the ACS system may also include separate service-providing entities, used strictly to perform specific tasks. In FIG. 3, an Advanced Intelligent Network (AIN) Intelligent Peripheral 300 is used to perform speech recognition in order to determine the party to be called. The Intelligent Peripheral 300 communicates with the PSTN ACS GWFE 108 through AIN messages, and is connected to and disconnected from the caller depending on the need for its services. FIG. 3 will be discussed in more detail below.

In terms of the ACS service itself, an ACS subscriber first builds a directory of the individuals he/she wishes to be able to reach, prior to using the ACS system. The directory must include some routing information for each entry, such as the individual's directory number (DN) for the PSTN and an IP address or pseudo-address for the Internet. If an IP address is not known, the subscriber must know which pseudo-address the called party uses when registering to directory services such as Microsoft ILS, so that the ACS service can fetch the IP address when needed. The building of the directory may be done at a well-known location in the Internet, the location having a known URL, using a browser such as Netscape Navigator, or on the PSTN through an Interactive Voice Response (IVR) system.

In order to access the ACS system from a phone, the user must dial into the system, using either a dedicated DN or feature code, and inform the system of the particular individual, listed in his/her subscriber directory, to be reached, either by speaking a name (Voice-Activated Dialling or VAD) or by entering the DN or any other code uniquely identifying the party to be called. The ACS system will then complete the call according to the routing instructions stored by the user. If the call must be completed over the Internet and only a pseudo-address is available, the ACS system will automatically fetch the current IP address from the Internet. If the called party is currently connected, the ACS system will direct the PSTN portion of the call to a VOIP gateway, which will connect the caller to the called party via the Internet.

The ACS service is therefore made up of the following components:
subscriber Database
Profile Management
IP Address Retrieval
Condition Checking
Call Delivery
Subscriber Database A portion of the Subscriber Database 204 is reserved for each ACS service subscriber. The Subscriber Database 204 as shown in FIG. 2 contains a record for each such subscriber, where this record includes an information element formed of multiple fields, each containing specific information, such as:
a subscriber ID;
the home phone directory number (if different from the subscriber ID) to automatically associate calls made to the service from the subscriber's main directory number;
the number of entries allowed in the subscriber's directory;
the directory itself which contains multiple entries, each entry including:
  name of the person, e.g. John Smith;
  directory number;
  IP address or pseudo-address, where a sample pseudoaddress would be an e-mail address such as johns@xxx.xx;
  server for address translation;
  preferred IP carrier;
  routing information;
    time of day routing;
    day of week routing;
    least cost routing, such as:
      complete to VoIP if IP address available;
      complete to called party directory number using IP through a terminating VOIP gateway;
      complete to called party directory number using PSTN;
    priority list (e.g. IP first, PSTN otherwise if calling from IP);
    Quality of Service (QoS) bypass flag (e.g. force ACS to use IP in spite of low quality of service).
The above list is non-exhaustive and could contain other elements.

Profile Management

Different means are available to the ACS service subscriber for accessing his/her section of the Subscriber Database, for example a web browser, an IVR system (with or without speech recognition), among other available interfaces. The Profile Management tool allows the subscriber to view and modify his/her personal directory.

IP Address Retrieval

An important attribute of the ACS system is its automatic retrieval of the IP address of a called party that does not have a permanent IP address. Most Internet users connect to the Internet through the services of an Internet Service Provider (ISP) using a dial-up connection. The IP address associated with that type of connection is valid only for the duration of a call. The IP address is picked from a pool of addresses owned by the ISP. Once the call is over, the IP address is returned to the pool and can be reused by another person establishing a dial-up connection. Therefore, when a caller wants to make a voice-over-IP (VoIP) call to someone connected to the Internet through a dial-up connection, he/she must first figure out the current IP address of that person.

Originally, the solution was for the caller to send an e-mail message to the called party including the caller's own IP address so that the called party could establish the call. More recently, companies have deployed servers in the Internet domain that would let people post their IP address so than anyone would know where they could be contacted, for example Microsoft Internet Locator Service. People connecting to the Internet can now configure their VoIP client to automatically register on one of these dedicated servers, so as to make their availability for receiving IP phone calls known to everyone.

Specific to the present invention, the use of gatekeepers provides a standardized way to get the IP address, where these gatekeepers are used to manage all IP telephony related activities in a particular zone. The gatekeeper performs call control, manages bandwidth and performs address translation, among other responsibilities. The gatekeeper effectively allows the ACS service to automatically and transparently retrieve the IP address (if available) when needed in order to complete a call. Therefore, when the Internet is needed in order to complete the call for a subscriber's particular communication session, and an IP address is not available in the Subscriber Database of the SLC, the SLC communicates with the gatekeeper in order to complete disposition of the communication session. When the Internet is not needed in order to complete the call, the SLC completes the disposition of the communication session in accordance with the subscriber's communication session disposition program stored in the Subscriber Database of the SLC. The use of a gatekeeper enables a subscriber to reach someone on the Internet with no permanent address without the need for the subscriber to access the Internet. ACS does so transparently by querying on the subscriber's behalf the different systems (gatekeepers, ILS, etc) containing this information.

Condition Checking

The ACS system uses the routing information associated to a particular name in the subscriber's database to decide how to handle an outgoing call. If no routing information is available, the system uses a default routing algorithm:

For PSTN-originated calls: complete the call on the PSTN;
For IP-originated calls:
 complete the call on IP if an address is available;
 complete the call on the PSTN through a gateway.

The caller can override the stored routing instructions on a per-call basis. This can be done by entering an extra digit, for example #, at the end of the identifying string or by saying it explicitly on a voice-activated system, for example "John Smith on Internet".

Call Delivery

When a call stays inside the PSTN/Mobile or IP network, the call is delivered directly to the called party terminal. However, when a call originating from one network has to terminate on the other, the ACS system forwards the call to a PSTN/IP gateway for proper bridging. Information on how to complete the call is also sent to the gateway by the ACS system.

Figure 4:
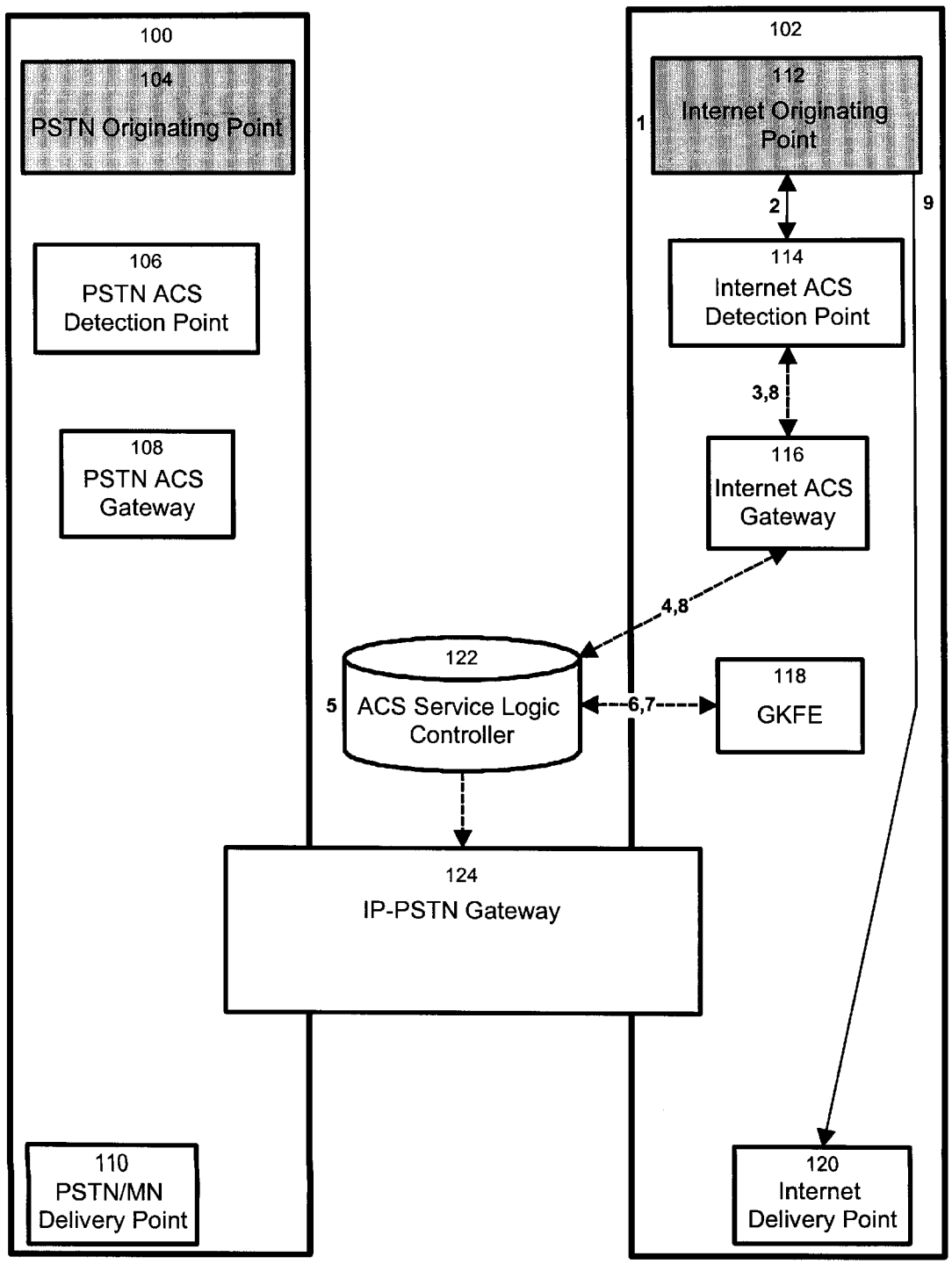
FIG. 4 depicts an example of a functional information flow, originating in the PSTN/Mobile domain, for the communication session disposition system shown in FIG. 1.

FIGS. 3 and 4, accompanied by the following descriptions, depict two different information flows. The purpose of these information flows is to illustrate the overall ACS system behaviour, but is in no way intended to limit the scope of the present invention to these specific flows.

In FIG. 3, the information flow illustrates an ACS-originated call from the PSTN network, using AIN-VAD:
1. The user picks up his phone.
2. The user dials a *XX access code (explicit access to VAD).
3. The PSTN ACS Detection Point FE 106 triggers on the Service Switching Point (SSP) when the *XX code is dialled. The SSP suspends call processing and invokes the resident AIN software (PSTN ACS Gateway 108).
4. The PSTN ACS GWFE 108 sends a query to the Service Logic Controller 122 that is located on an AIN Service Control Point.
5. The SLC 122 sends an AIN message to the SSP to connect the caller to an Intelligent Peripheral 300 in order to collect the name.
6. The user speaks the name of the party he wants to reach.
7. The Intelligent Peripheral 300 performs speech recognition and returns the name (or a pointer to the name in the SLC 122 database) to the SLC 122. The caller is disconnected from the Intelligent Peripheral 300; the call returns to the suspended state.
8. The SLC 122 uses the information returned by the Intelligent Peripheral 300 to get the proper record from the subscriber database. This record indicates that the call to this person should be completed using the Internet between 08:00 and 18:00 if the person is connected to the Internet.
9. As the current time is 12:30, the SLC 122 queries the IP GKFE 118 using the stored pseudo-address from the subscriber database.
10. The IP GKFE 118 returns to the SLC 122 the IP address corresponding to this pseudo-address indicating that this person is currently connected to the Internet and ready to receive VOIP calls.
11. The SLC 122 returns to the SSP an AIN message to route the call to a PSTN/IP GWFE 124.
12. The SLC 122 sends a message to the PSTN/IP GWFE 124 over the Internet supplying the IP address associated to the call just forwarded.
13. The PSTN/IP GWFE 124 receives the call from the network. The call information associated with this call contains the phone number of the calling party (the subscriber); this phone number is used to match this incoming call with the message sent by the SLC 122 containing the destination IP address. The PSTN/IP GWFE 124 makes a call to the called party IP address and bridges this IP connection with the PSTN connection to the subscriber.

Note that at step 7 above the SLC 122 could ask the SSP to connect the caller to an announcement while waiting for the IP address. Also, at step 13 above, the calling party ID is sufficient to uniquely identify a user calling from a residential line or from most business lines. Additional information could be passed for the cases where the calling number is not sufficient, such as calls from behind a Private Branch Exchange (PBX). Finally, an important feature of the ACS service is that it does not rely on Voice-Activated Dialling (VAD). The speech recognition part could be replaced by digit collection. In other words, the subscriber could enter the DN of the person to reach or a mnemonic code.

In FIG. 4, the information flow illustrates auto-origination from the IP network:
1. The user connects to the Internet and starts a VOIP client modified to support this service. The user either enters the name of the person to call, uses a Speed Dial entry, or speaks the name of the person to call if the client is voice-enabled.
2. The VOIP client (Internet ACS DPFE 114) detects that the data entered in the called party field is not an address and suspends call processing.
3. The VOIP client sends a message to a node in the Internet domain that acts as the Internet ACS GWFE 116. The message contains the subscriber ID (e.g. his home phone number) and the name of the person to reach.
4. The ACS IP GWFE 116 reformats and sends the query to the SLC 122.
5. The SLC 122 uses the received information to access the subscriber's database. This record indicates that the call to this person should be completed using the Internet between 08:00 and 18:00 if the person is connected to the Internet.
6. The SLC queries the IP GKFE 118 using the stored pseudo-address from the subscriber's database.
7. The IP GKFE 118 returns to the SLC 122 the IP address corresponding to this pseudo-address indicating that this person is currently connected to the Internet and ready to receive VoIP calls.
8. The SLC 122 returns to the Internet ACS GWFE 116 a message indicating to route the call to the IP address retrieved from the Internet domain.
9. The Internet ACS GWFE 116 reformats the message and forwards it to the VOIP client.
10. The VOIP client establishes the connection to the returned IP address.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

I claim:

1. A method for managing a communication session originating in either one of a telecommunications network and the Internet domain, said method comprising the steps of:
   detecting origination of a communication session in either one of the telecommunications network and the Internet domain;
   suspending processing of the communication session;
   accessing a data structure containing a plurality of records, each record including an information element indicative of a certain communication session disposition program;
   associating a record in said data structure with the communication session, the record including an entry indicative of a particular disposition program applicable to the communication session, the entry including a data element indicative of a pseudo-address in the Internet domain;
   if the entry applicable to the communication session is instructive to establish an Internet domain connection, translating the pseudo-address to an IP address;
   utilising the IP address to manage the communication session.

2. A method for managing a communication session as defined in claim 1, wherein said data structure is supported on a service logic controller, said method comprising the step of establishing a communication between said service logic controller and a certain entity to transmit data from said service logic controller to said certain entity to enable the certain entity to establish a bridging connection between the telecommunications network and the data communications network.

3. A method for managing a communication session as defined in claim 2, wherein said certain entity is an inter-network gateway.

4. A method for managing a communication session as defined in claim 3, wherein the telecommunications network includes the PSTN.

5. A method for managing a communication session as defined in claim 4, wherein the telecommunications network includes a mobile telephone network.

6. A service logic controller for the management of communication sessions originating in either one of a telecommunications network and the Internet, said service logic controller including:
   a central processing unit;
   a memory in data communicative relationship with said central processing unit, said memory holding a data structure including a plurality of records, each record including an information element indicative of a certain communication session disposition program;
   a program element in said memory that is executed by said central processing unit;
   a first connection point permitting to exchange data between said service logic controller and the telecommunications network;
   a second connection point permitting to exchange data with the Internet;
   a third connection point permitting to exchange data with an Internet gatekeeper functional element, the Internet gatekeeper functional element returning in response to Internet address request messages Internet location messages;
   said program element implementing the functions of:
   a) processing a communication session disposition inquiry message input through either one of said first and second connection points to associate a certain record in said data structure with the communication session disposition inquiry message;
   b) if the communication session disposition program of said certain record is instructive to establish an Internet domain connection, generating and outputting through said third connection point an Internet address request message to seek an IP address of a party with whom a communication session is to be established;
   c) processing an Internet location message received at said third connection point in response to the Internet address request message and containing an IP address of a party with whom a communication session is to be established to generate and output through either one of said first and second connection points a communication session disposition instructions message including the IP address of a party with whom a communication session is to be established.

7. A service logic controller as defined in claim 6, wherein each record of said data structure is associated to a particular subscriber.

8. A service logic controller as defined in claim 7, wherein the information element of a record includes an identification tag specific to the particular subscriber associated to the record.

9. A service logic controller as defined in claim 8, wherein the information element of a record further includes a subscriber directory, the subscriber directory containing an entry for each party with whom a communication session may be established by the subscriber.

10. A service logic controller as defined in claim 9, wherein the subscriber directory entry for a particular party contains data elements specific to the disposition of a communication session to be established between the subscriber and the particular party.

11. A service logic controller as defined in claim 10, comprising a fourth connection point permitting to transmit data to an inter-network gateway capable to route data between the telecommunications network and the data communications network.

12. A service logic controller as defined in claim 11, wherein said first and second connection points connect with the telecommunications network and the data communications network, respectively, through respective gateways.

13. A service logic controller as defined in claim 12, wherein the data communications network is the Internet.

14. A service logic controller as defined in claim 13, wherein the telecommunications network includes the PSTN.

15. A service logic controller as defined in claim 14, wherein the telecommunications network includes a mobile telephone network.

16. A system for the management of communication sessions originating in either one of a telecommunications network and the Internet, said system comprising:
   a service logic controller, including:
   a) a central processing unit;
   b) a memory in data communicative relationship with said central processing unit, said memory holding a data structure including a plurality of records, each record including an information element indicative of a certain communication session disposition program;

c) a program element in said memory that is executed by said central processing unit;

d) a first connection point permitting to exchange data between said service logic controller and the telecommunications network;

e) a second connection point permitting to exchange data with the Internet;

a gatekeeper functional element in a data communicative relationship with said service logic controller, said program element implementing the functions of:

i) processing a communication session disposition inquiry message input through either one of said first and second connection points to associate a certain record in said data structure with the communication session disposition inquiry message;

ii) if the communication session disposition program of said certain record is instructive to establish an Internet domain connection, generating and forwarding to said gatekeeper functional element an Internet address request message to seek an IP address of a party with whom a communication session is to be established;

said gatekeeper functional element being responsive to the Internet address request message to obtain the IP address of the party with whom a communication session is to be established and to generate and forward to said service logic controller an Internet location message containing the IP address of the party with whom a communication session is to be established, said program element implementing further functions, including:

processing the Internet location message received at said third connection point to generate and output through either one of said first and second connection points a communication session disposition instructions message including the IP address of a party with whom a communication session is to be established.

17. A system as defined in claim 16, comprising an inter-network gateway for routing data between the telecommunications network domain and the data communications network domain, the inter-network gateway responsive to data received from said service logic controller to bridge a connection between the telecommunications network and the data communications network.

* * * * *